United States Patent [19]

Kaneko et al.

[11] Patent Number: 4,972,267
[45] Date of Patent: Nov. 20, 1990

[54] STILL-VIDEO CAMERA FOR ELIMINATING DARK CURRENT DIFFERENCES

[75] Inventors: Kiyotaka Kaneko; Izumi Miyake; Yoshio Nakane; Yutaka Maeda; Hiroshi Shimaya; Kazuya Oda, all of Tokyo, Japan

[73] Assignee: Fuji Photo Film Co., Ltd., Kanagawa, Japan

[21] Appl. No.: 363,865

[22] Filed: Jun. 9, 1989

[30] Foreign Application Priority Data

Jun. 14, 1988 [JP] Japan .............................. 63-144618
Sep. 19, 1988 [JP] Japan .............................. 63-234353

[51] Int. Cl.⁵ .............................................. H04N 3/14
[52] U.S. Cl. ................................ 358/213.22; 358/909; 358/213.19
[58] Field of Search ...................... 358/213.19–213.22, 358/909, 213.31, 213.26, 213.13

[56] References Cited

U.S. PATENT DOCUMENTS

| | | | |
|---|---|---|---|
| 4,597,014 | 6/1986 | Suzuki | 358/213.19 |
| 4,603,355 | 7/1986 | Yamada et al. | 358/213.22 |
| 4,831,453 | 5/1989 | Takemura | 358/213.22 |
| 4,866,528 | 9/1989 | Yamazaki et al. | 358/213.22 |
| 4,914,518 | 4/1990 | Suga | 358/213.19 |

Primary Examiner—Stephen Brinich

[57] ABSTRACT

In an electronic still-video camera capable of frame recording using a shutter, read-out is controlled in such a manner that dark currents generated in an imaging device will be equal in both first and second fields. Thereby, the recording of a still-video signal that will provide an excellent and easy-to-view reproduced image that is free of flicker is made possible.

4 Claims, 7 Drawing Sheets

STILL-VIDEO CAMERA FOR ELIMINATING DARK CURRENT DIFFERENCES

BACKGROUND OF THE INVENTION

1. Field of the Invention:

This invention relates to a still-video camera (an electronic still camera) capable of frame recording (frame photography) using a shutter.

The term "frame recording" is used in contradistinction to "field recording". In field recording, one frame (one image) of an image is expressed using one field of a video signal, and one field of a still-video signal is recorded on a recording medium in order to record one frame of an image. In frame recording, on the other hand, one frame of an image is expressed using first and second fields, for a total of two fields (one frame) of a still-video signal in interlaced scanning, and a still-video signal of two fields per frame image is recorded on the recording medium.

2. Description of the Related Art:

In a still-video camera, it is possible to control the storage time of an electric charge in a solid-state electronic imaging device by using a shutter. Since storage of the electric charge in the imaging device is performed during the time that the shutter is open (i.e., during the exposure time), read-out from the image pick-up device is prohibited at this time. When the shutter is closed (i.e., when the exposure ends), the charge is read out of the imaging device at a predetermined timing and the read still-video signal is recorded on a recording medium (which may include a magnetic disk and a semiconductor memory).

In an imaging device, a dark current is produced at all times. As a result of the dark current, charge continues to be stored during the passage of time regardless of whether the imaging device is being exposed or not. The level of the dark current varies in accordance with the charge storage time.

In the frame recording mode of operation for a still-video camera, read-out of the video signal (stored charge) from the imaging device is performed by interlace scanning, so that a still-video signal of two fields is read-out one field at a time. However, there is generally a difference of one vertical scanning interval between the storage time of dark current in the first field and the storage time of dark current in the second field. As a result, a difference develops between the levels of these dark currents. Therefore a considerable difference exists between the brightness levels of the two fields of video signals forming one frame. When a video signal containing such a dark current is recorded on a recording medium, there is the danger that flicker will be produced when the signal is played back for display on a display unit such as a CRT, which will result in an unattractive picture.

Figure 7:
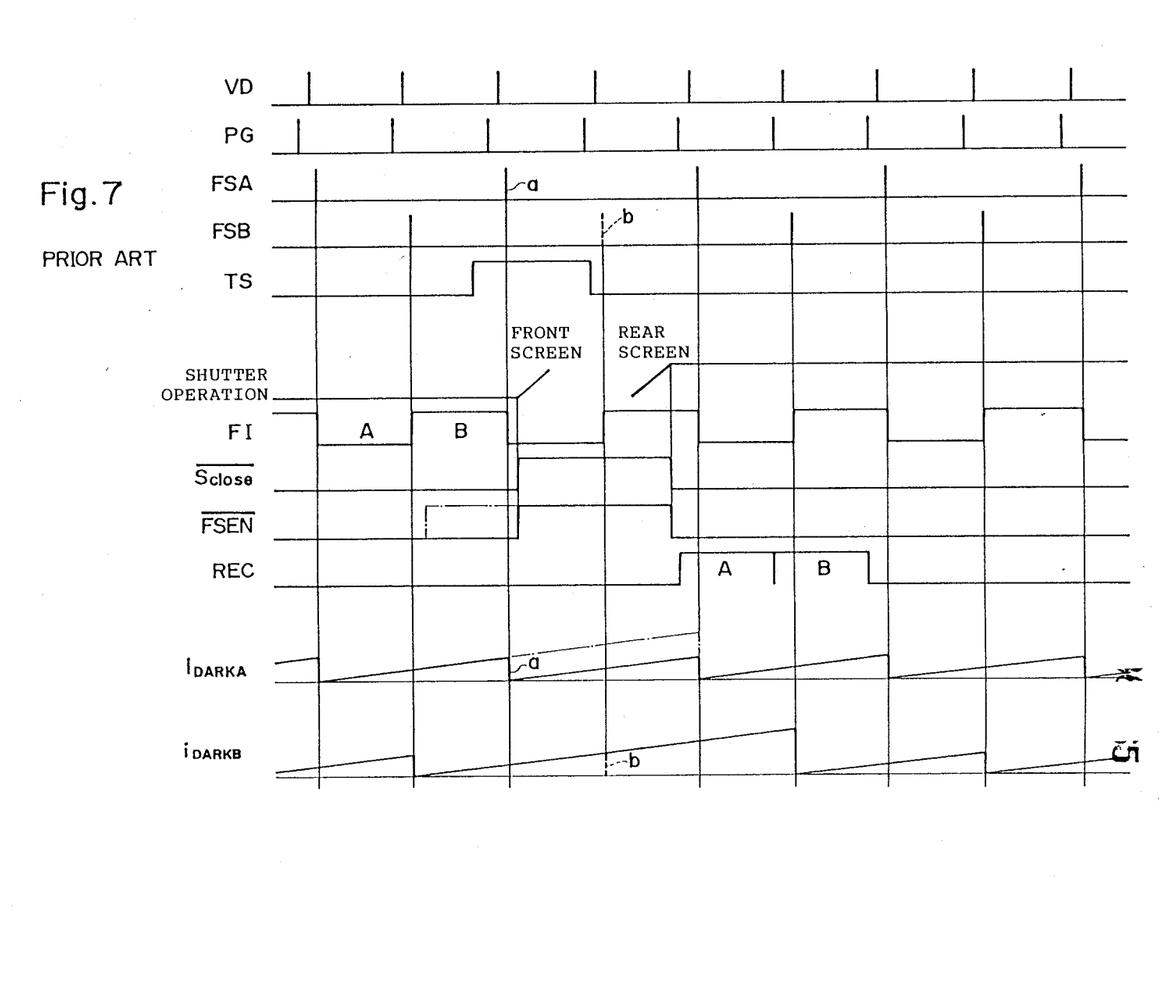
FIG. 7 is a time chart corresponding to FIG. 2 and illustrating the operation of the conventional still-video camera.

This operation will now be described in greater detail with reference to FIG. 7. Read-out from a solid-state electronic imaging device is performed by reading out a first field (field A) in response to a field-shift signal FSA and a second field (field B) in response to a field-shift signal FSB. These field-shift signals FSA and FSB are generated alternately at a fixed period. A field-shift enable signal FSEN controls whether readout from the imaging device in response to the field-shift signals FSA and FSB is to be enabled or disabled. The signal FSEN attains an H level to disable read-out during the time that the shutter is open (i.e., during the time that a shutter-closed signal $S_{close}$ is at the H level). In the example of FIG. 7, only read-out in field B is disabled (the disabled signal FSB is indicated by the dashed line b), so that a dark current $i_{DARKB}$ in field B continues to increase without being swept out. Accordingly, in read-out and recording (the interval during which the signal REC is at the H level) performed after the shutter is closed, a problem that arises is that the level of the dark current $i_{DARKB}$ contained in the read signal of field B becomes higher than the level of the dark current $i_{DARKA}$ in the read signal of field A.

It is known that noise due to smear is superimposed on the video signal when a CCD image sensor is used as the imaging device. Noise attributable to smear is caused in such a way that specifically, when light impinges upon the light-receiving section, light, particularly in the infra-red region, induces unnecessary electric charge in portions other than the light-receiving section, such as in the substrate portion of the CCD image sensor, and the charge so produced becomes mixed in the transfer path.

In order to eliminate smear-induced noise, an effective method entails clearing the transfer path at the completion of exposure to remove excess electric charge from the transfer path, followed by transmitting the charge stored up in the light-receiving section to the transfer path (i.e., reading out the signal).

SUMMARY OF THE INVENTION

An object of the present invention is to provide a still-video camera capable of frame recording using a shutter. The camera is adapted so that a difference will not be produced between dark currents contained in two successively read-out fields of a still-video signal forming a single frame.

Another object of the present invention is to provide a still-video camera in which, when the camera is so arranged that flicker will not be produced in a played back image by assuring that a difference will not be produced between dark currents, smear noise can be eliminated at the same time.

In accordance with the present invention, the foregoing objects are attained by providing a still-video camera comprising a solid-state electronic imaging device from which readout is possible by interlaced scanning, a shutter for controlling incidence of a subject light image upon the solid-state imaging device, means for controlling interlaced scanning readout in the solid-state electronic imaging device by alternately generating field shift signals of first and second fields at a fixed period, and disabling means for disabling readout by the field shift signals at least while the shutter is open. The disabling means operates in such a manner that equal numbers (inclusive of zero) of the field shift signals for the first and second fields are disabled.

In accordance with the invention, the time during which read-out from the solid-state imaging device is inhibited, inclusive of the time during which the shutter is open, is set to be equal in the first and second fields that form one frame. As a result, even if dark current increases with the passage of time, the magnitudes of the dark currents in these fields will be substantially equal. The dark current components contained in the still video signals read out of the imaging device and stored on the recording medium will be substantially equal in the first and second fields. Accordingly, almost no flicker based on a difference between dark currents is produced when recorded still-video signals are played back and displayed on a display unit. The resulting picture therefore is attractive and easy to see.

Further, in accordance with the invention, one field-shift signal or two field-shift signals for the first and second fields immediately after closure of the shutter are disabled by the disabling means. Even in this case, the time during which read-out from the solid-state imaging device is inhibited, inclusive of the time during which the shutter is open, is set to be equal in the first and second fields that form one frame.

Since read-out of a signal charge from the imaging device is disabled in at least one vertical scanning interval immediately after closure of the shutter (the end of exposure ), the change transfer path in the imaging device can be cleared. This makes it possible to eliminate smear noise.

BRIEF DESCRIPTION OF THE DRAWINGS

The present invention will become more fully understood from the detailed description given herein below and the accompanying drawings which are given by way of illustration only, and thus, are not limitative of the present invention, and wherein.

DESCRIPTION OF THE PREFERRED EMBODIMENTS

Figure 1:
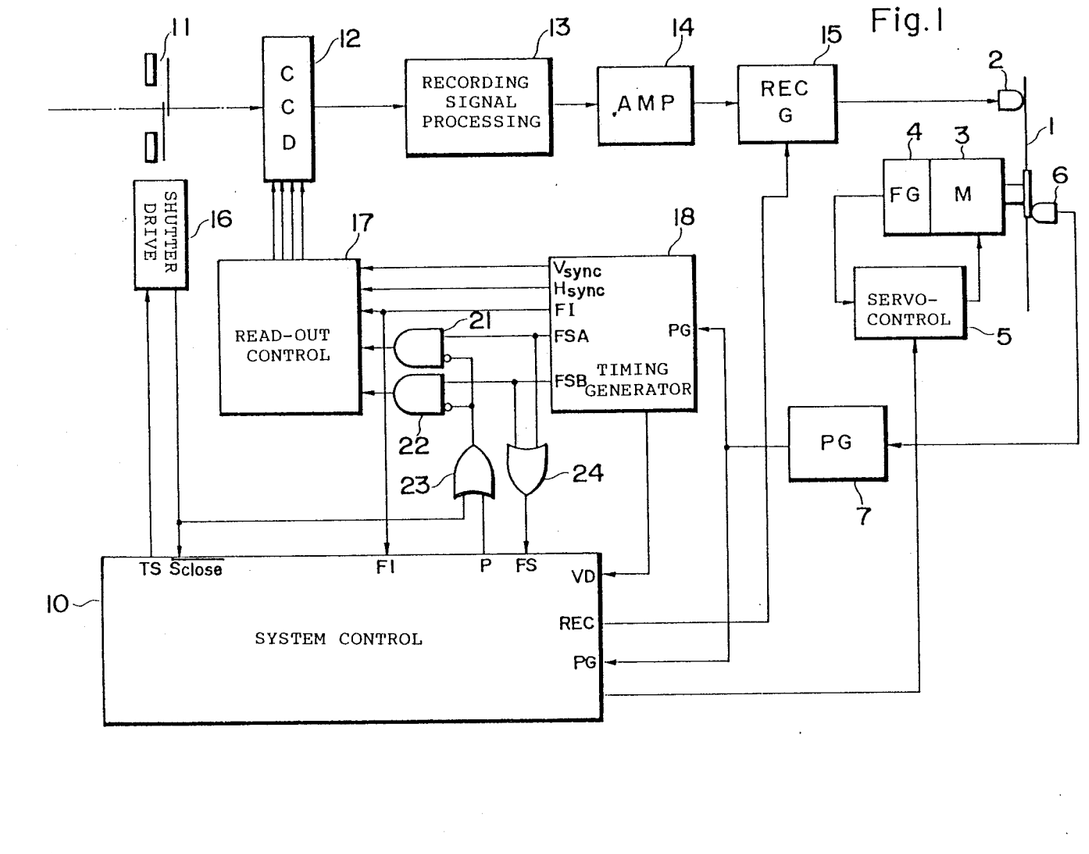
FIG. 1 is a block diagram illustrating the electrical construction of a still-video camera in one embodiment of the present invention.
Figure 2:
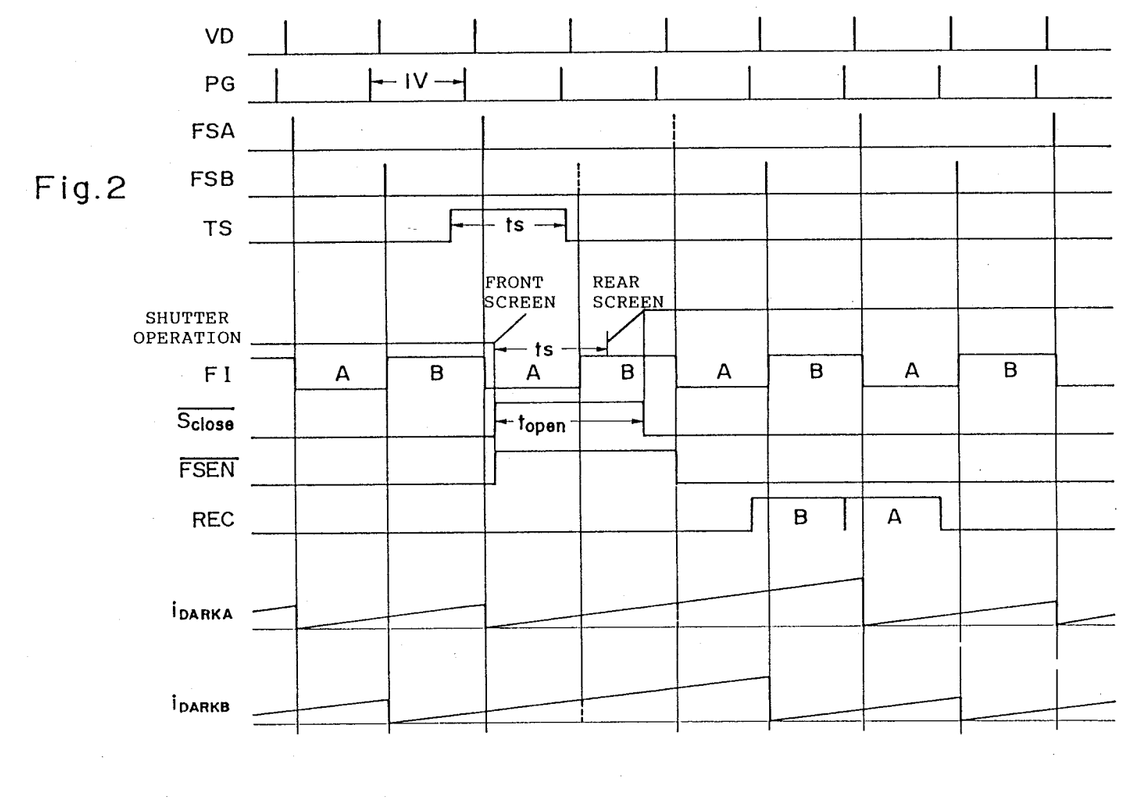
FIG. 2 is a time chart illustrating the operation of the electrical circuitry of FIG. 1.

FIG. 1 is a block diagram illustrating the electrical construction of a still-video camera embodying the present invention and necessary for describing the invention, and FIG. 2 is a time chart illustrating signals associated with the still-video camera of FIG. 1.

The overall operation of the still-video camera is under the control of a system control unit 10 which includes such components as a CPU, a memory and the required interface circuitry. A video floppy 1 serving as a magnetic recording medium is provided with a plurality (e.g. 50) of circular, concentrically disposed tracks having a track pitch of e.g. 100 μm. Magnetically recorded on one or two tracks by imaging processing is one field or one frame of a frequency-modulated color still video signal (inclusive of luminance and chrominance signals, etc.). The 50 tracks concentrically provided on the magnetic recording surface of the magnetic disk 1 are numbered consecutively from No. 1 to No. 50 starting from the outer side of the disk.

A disk motor 3 for driving the rotation of the video floppy 1 is controlled by a servo-control circuit 5. More specifically, the rotational speed (rpm) of the disk motor 3 is detected by a frequency generator 4, which outputs a detection signal having a frequency proportional to the rotational speed of the motor 3. This signal enters the servo-control circuit 5. Based on a reference clock signal having a fixed frequency and the detection signal which enters from the detector 4, the servo-control circuit 5 controls the motor 3 so that the motor 3 will rotate at a fixed rotational speed (e.g., 3600 rpm). The servo-control circuit 5 functions also to start and stop the motor 3 in dependence upon a command from the system control unit 10.

A magnetic head 2 (two of which are provided in a spaced relation at mutually adjacent tracks so as to make frame recording possible) for the purpose of writing still-video signals of an imaged subject on predetermined tracks of the video floppy 1 is supported so as to be freely movable in a radical direction of the video floppy 1, and the feed is controlled in the same direction, by a transfer drive control device, not shown. The transfer drive control device includes a stepping motor and a driver for the stepping motor. The system control unit 10 provides the transfer drive control device with instructions with respect to the direction and amount of feed of the magnetic head 2.

Disposed near the core of the video floppy 1 is a phase detector 6 for detecting leakage flux from a chucking permanent magnet and outputting a phase detection signal when the video floppy 1 arrives at a predetermined angular position. The output signal of the phase detector 6 has a waveform shaped by a phase pulse generator circuit (waveshaper circuit) 7. The output of the phase pulse generator circuit 7 is a phase pulse PG fed into the system control unit 10 and a timing generator circuit 18. One phase pulse PG is generated for every revolution of the video floppy 1. When the video floppy 1 is rotating at a steady speed (3600 rpm), the period of the phase pulse PG is 1/60 sec, which corresponds to 1 V (one vertical scanning interval).

The imaging optical system includes an imaging lens system (not shown) for imaging a subject, a diaphragm (not shown) and a shutter 11. A latch release of front and rear curtains of the shutter 11 as a well as shutter wind-up is executed by a shutter drive unit 16, which includes a shutter motor. The shutter drive unit 16 is controlled by the system control unit 10. More specifically, the system control unit 10 applies a shutter control signal TS to the shutter drive unit 16. The control signal TS is outputted at a predetermined timing, as will be described below, which follows a depression of a shutter-release button (not shown) and attains an H level during an exposure time ts. The shutter drive unit 16 releases the latch of the front curtain (screen) at the leading edge of the control signal TS to cause the front curtain to run, releases the latch of the rear curtain at the trailing edge of the signal TS and then this curtain is driven. The shutter drive unit 16 outputs a shutter close signal $S_{close}$, which assumes the H level from the moment the latch of the front curtain is released to the moment travel of the rear curtain ends. This signal is applied to the system control unit 10 and an OR gate 23, as will be described below.

A solid-state imaging device 12 for the three primary colors includes a two-dimensional imaging cell array, such as a CCD, which is disposed in the focal plane of the imaging optical system. The imaging device 12 is capable of having a stored charge of one frame (two fields) read out by interlaced scanning. One example is an interline transfer-type imaging device. The dark current of the imaging device or image data accumulated while the shutter 11 is open is read out as a serial video signal under the control of a read control circuit 17 using various timing signals generated by the timing generator circuit 18.

The timing generator circuit 18 generates a vertical reference signal VD synchronized to the input phase pulse PG but and lags slightly behind the pulse PG. The reference signal VD is applied to the system control unit 10. The system control unit 10 executes various types of control using the reference signal VD and the phase pulse PG as a reference timing.

The timing generator circuit 18 generates a field shift signal FSA of a first field (field A) lagging slightly behind the vertical reference signal VD and having a period twice the period of the phase pulse PG, a field shift signal FSB of a second field (field B), and a field index signal FI. The field shift signals FSA and FSB, each of which has a period twice the period of the phase pulse PG and repeats in an alternating fashion at the period of the pulse PG, are applied to the read control circuit 17 via disable gates 21 and 22 as will be described below. The field index signal FI repeatedly changes between the H and L levels whenever the field shift signals FSA and FSB are generated. When the signal FI is at the L level, a reading of field A is represented and when the signal Fi is at the H level, a represents reading of field B is represented. The signal FI is applied to the read control circuit 17 and the system control unit 10. It can be so arranged that the signals FSA, FSB and FI are generated by the read control circuit 17 rather than by the timing generator circuit.

The timing generator circuit 18 generates a vertical synchronizing signal Vsync and a horizontal synchronizing signal Hsync for reading the image data out of the imaging device 12. These synchronizing signals enter the read control circuit 17.

If the imaging device 12 is an interline-type device, then accumulated electric charges of the first field at the light-receiving section of the imaging device 12 are transferred instantaneously to the adjacent vertical transfer CCDs by the field shift signal FSA (transfer pulse) applied to the read control circuit 17. Thereafter, electric charges are transferred the vertical transfer CCDs to a horizontal transfer CCD and output of the serial video signal from the horizontal transfer CCD are carried out in synchronization with the horizontal synchronizing signal and a clock pulse (a pulse for reading out each pixel), respectively, over an interval of 1 V. When the field shift signal FSB is applied, the stored charges of the second field at the light-receiving section are transferred to the vertical transfer CCDs. Thereafter, read-out operation is performed in the same manner.

The serial still-video signal (R,G,B) read out of the imaging device 12 enters a recording signal processing circuit 13. The recording signal processing circuit 13 has a preamplifier circuit to which the still-video signal (R,G,B) is applied, a variable gain amplifier circuit (white balance adjustment circuit), a process matrix circuit, a frequency modulator circuit and a mixer circuit. A luminance signal Y and two color difference signals R-Y, B-Y are formed in the process matrix circuit. These color difference signals R-Y and B-Y are then line-sequenced every 1 H by a line sequencer circuit. The luminance signal Y and the line-sequenced color difference signals are applied, via a preemphasis circuit (not shown), to two frequency modulator circuits where the signals are frequency-modulated at different frequency bands before being combined by the mixer circuit.

The resulting synthesized frequency-modulated still-video signal enters a recording gate circuit 15 after being amplified by a recording amplifier circuit 14. The gate circuit 15 opens when the recording signal REC outputted by the system control unit 10 at a predetermined timing, as will be described below, attains the H level. In the case of frame recording, the recording signal REC attains the H level for two consecutive periods of the phase pulses PG. In the first of these periods, the frequency-modulated still-video signal of field A or field B is applied to one of the two magnetic heads 2. In the second of the periods, the frequency-modulated still-video signal of field B or field A is applied to the other of the two magnetic heads 2. In this way recording is performed on one track and one field at a time over two tracks of the video floppy 1.

Several ways in which the disable gates 21 and 22 may be controlled in order to disable equal numbers (inclusive for zero) of the pulses of the field shift signal FSA of field A and for the field shift signal FSB of field B will be described next. The disable gates 21 and 22 are controlled by a field shift enable signal FSEN.

(1) If the field shift enable signal FSEN is formed in such a manner that the leading edge of the shutter closure signal $S_{close}$ and the leading edge of the field-shift enable signal FSEN coincide (see FIG. 2), then the point in time at which the trailing edge of the signal FSEN occurs is adjusted in such a manner that read-out after shutter closure (read-out of a signal for a recording inclusive of image data) is performed from a field different from the field in which charge sweep-out (which has the same meaning as read-out but is used when referring to a case in which only dark current is read out) is performed by the field shift signal immediately prior to the leading edge of the shutter closure signal $S_{close}$. This can be accomplished in the following two ways:

(1-1) The point in time at which the shutter is opened (which corresponds to the leading edge of the signal $S_{close}$) is fixed beforehand in relation to field read-out. For example, the moment of the shutter opening is controlled to occur immediately after sweep-out of field A, and read-out for recording after shutter closure is performed from field B, which appears first after the shutter is closed (i.e., following the trailing edge of the signal $S_{close}$). This is the example illustrated in FIG. 2.

(1-2) The point in time of the shutter opening is decided without relation to field read-out, and the field which prevails at the moment of the shutter opening is judged (detected). It is arranged so that a field different from the field detected is made to coincide with the field read out first following closure of the shutter.

(2) The field shift enable signal FSEN is formed in such a manner that the trailing edge of the shutter closure signal $S_{close}$ and the trailing edge of the field shift enable signal FSEN coincide. The point in time of the shutter opening is controlled so that the field read out immediately after shutter closure will be either field A or B without fail. The number of times (inclusive of zero) that the signals FSA and FSB are inhibited during the time of the shutter opening (the time during which the signal $S_{close}$ is at the H level) are counted in advance, and read-out immediately prior to the opening so that the shutter is inhibited when the numbers of inhibitions are not the same. For example, though the field shift signal FSB is disabled once, as indicated at b in FIG. 7, the number of times of disabling the field shift signal FSA is zero. Therefore, the leading edge of the signal FSEN is advanced slightly, as indicated by the phantom line, in order to disable the signal FSA indicated at a.

The foregoing processing can be executed by having the CPU of the system control unit 10 decide the timings of the leading and trailing edges of the field shift enable signal FSEN upon taking into consideration the entered field index signal FI, the shutter closure signal $S_{close}$, the calculated shutter open time (shutter speed), the timing of the shutter control signal TS to be outputted, etc.

It is also possible to execute the foregoing by using a calculation formula.

Specifically, let $t_{open}$ represent the shutter open time (the time during which the signal $S_{close}$ is at the H level), let $t_{FS}$ represent the field shift time (illustrated to be almost instantaneous in FIG. 2, namely the moment at which the dark current signals $i_{DARKA}$ and $i_{DARKB}$ decay), and let 1 V represent the field period (the period of the phase pulses PG). When the value n that satisfies the equation $$0 \leq t_{open} - nV < (1V - t_{FS})$$

is an odd number, the signal FSEN is made to rise 1 V earlier than the leading edge of the signal $S_{close}$ (in a case where the trailing edge of the signal FSEN coincides with the trailing edge of the signal $S_{close}$), or the signal FSEN is made to decay 1 V later than the trailing edge of the signal $S_{close}$ (in a case where the leading edge of the signal FSEN coincides with the leading edge of the signal $S_{close}$).

Formation of the signal FSEN using the foregoing calculation formula will now be described in accordance with method (1-1).

When there is an input from the shutter-release button of the camera, the CPU of the system control unit 10 calculates shutter speed (exposure time ts) based on the measurement results for the amount of entrant light performed by a photometric element (not shown). The field shift signals FSA and FSB are inputted to the system control unit 10 through the OR circuit 24, and the field index signal FI is also applied to the control unit 10, as mentioned above. Therefore, the CPU outputs the H-level shutter control signal TS so that the shutter will open immediately after sweep-out (the signal FSA) of the imaging device 12 in field A, and holds this signal at the H level for the period of time ts. In response thereto, the shutter 11 opens, the shutter drive unit 16 outputs the H-level shutter closure signal $S_{close}$, and the H-level shutter closure signals enters the system control unit 10. The H-level shutter closure signals also is directed through the OR circuit 23 for being applied as the field shift enable signal FSEN to the disable gates 21 and 22. As a result, the field shift signals FSA and FSB are prohibited from entering the readout control circuit 17.

The CPU counts the number of field shift signals FSA and FSB disabled while the H-level signal $S_{close}$ is being applied thereto, and the CPU clocks the shutter open time $t_{open}$. When the signal $S_{close}$ decays, the CPU determines whether the value n that satisfies the foregoing equation is an odd or even number (where even numbers include the number zero). Since n=1 in the example of FIG. 2, the CPU outputs an H-level signal at an output port P until the next field shift signal is inhibited. The H-level signal at the output port P is applied to the disable gates 21 and 22 as the signal FSEN via the OR gate 23. Thus, one each of the field shift pulses FSA and FSB is disabled, as illustrated by the dashed lines in FIG. 2.

The CPU outputs the recording signal REC, for an interval corresponding to 2 V, from the period of the field B, which is the first field that appears following closure of the shutter. Since field B appears following closure of the shutter, field B image data is first read-out from the imaging device 12 and recording of the data on the video floppy 1 are performed in response to the field-shift signal FSB. Subsequently, field A image data is read-out from the imaging device 12 and recording of the data on the video floppy 1 are performed in response to the field shift signal FSA in the next period. Since the dark currents $i_{DARKA}$ and $i_{DARKB}$ of the imaging device 12 read out along with the image data read-out are each disabled once along with the field-shift signals FSA and FSB, these currents assume approximately the same level.

A second embodiment of the invention in which elimination of smear noise is taken into account will now be described with reference to FIGS. 3 through 6.

Figure 3:
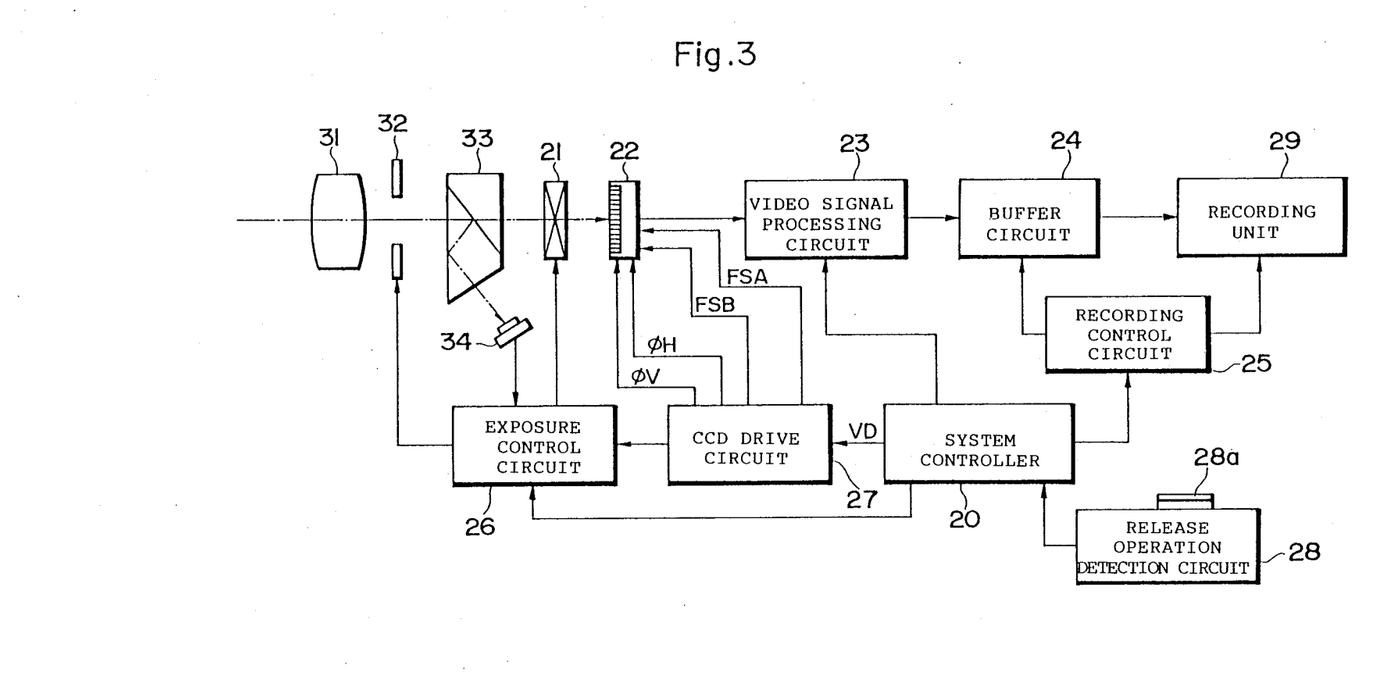
FIG. 3 is a block diagram illustrating the construction of a still-video camera for another embodiment of the invention.

FIG. 3 illustrates the construction of a still-video camera. Though FIG. 3 expresses the still-video camera somewhat differently than FIG. 1, both Figures in essence illustrate the same still-video camera.

In FIG. 3, a CCD image sensor 22 is used as the imaging device. During the time that a shutter 21 is open, the CCD image sensor 22 receives the light image of a subject via an imaging lens 31, a diaphram 32 and a beam splitter 33, converts the image into an electrical signal and applies the signal to a video signal processing circuit 23.

The shutter 21 and the diaphragm 32 are provided to adjust the amount of exposure of the CCD image sensor 22. In order to decide the amount of exposure, some of the incident light extracted by the beam splitter 33 is led to a light-receiving element (a photometric element) 34, the output of which is fed into an exposure control circuit 26. Based on the output signal from the light-receiving element 34, the exposure control circuit 26 calculates the f-stop and shutter speed that conform to the brightness of the subject for controlling the diaphragm 32 and the shutter 21. The operation of the exposure control circuit 26 is supervised by a system controller 20, which includes a microcomputer.

Besides controlling the exposure control circuit 26, the system controller 20 also controls the operation of a CCD drive circuit 27, the video signal processing circuit 23 and a recording control circuit 25. More specifically, when a release operation detection circuit 28 supplies the system controller 20 with a signal indicating that a release button 28a has been pressed halfway (i.e., a signal indicating that the button 28a has been depressed by half a stroke), the system controller 20 delivers a photometric timing signal to the exposure control circuit 26. In response, the exposure control circuit 26 accepts the subject brightness information from the light-receiving element 34 and computes the f-stop and the shutter speed.

When a signal indicating that the release button 28a has been depressed further is fed into the system controller 20 from the release operation detection circuit 28, the diaphragm 32 and the shutter 21 are driven in accordance with the f-stop and shutter speed computed by the exposure control circuit 26, so that the CCD image sensor 22 is irradiated with the subject light image at a suitable amount of exposure.

The CCD drive circuit 27 drives the CCD image sensor 22 in synchronization with a timing signal (e.g., the reference signal VD) from the system controller 20. In order to accept a video signal in accordance with the frame photography method, the CCD drive circuit 27 supplies the CCD image sensor 22 with the first field shift signal (pulse) FSA, the second field shift signal FSB, a vertical transfer pulse $\phi_V$, and a horizontal transfer pulse $\phi_H$.

The video signal processing circuit 23 converts the video signal serially outputted by the CCD image sensor 22 into an output signal in line with the NTSC system. The output signal thus obtained is supplied to a recording unit 29 via a buffer circuit 24 controlled by the recording control circuit 25. The recording unit 29 includes a device which, after converting the video signal supplied by the buffer circuit 24 into a digital signal, writes the digital signal into a card-type semiconductor memory, for example. In this way, still image video data can be recorded. It should be noted that a disk device which magnetically records the still-video signal on a still-video floppy can be used as the recording unit 29.

Figure 4:
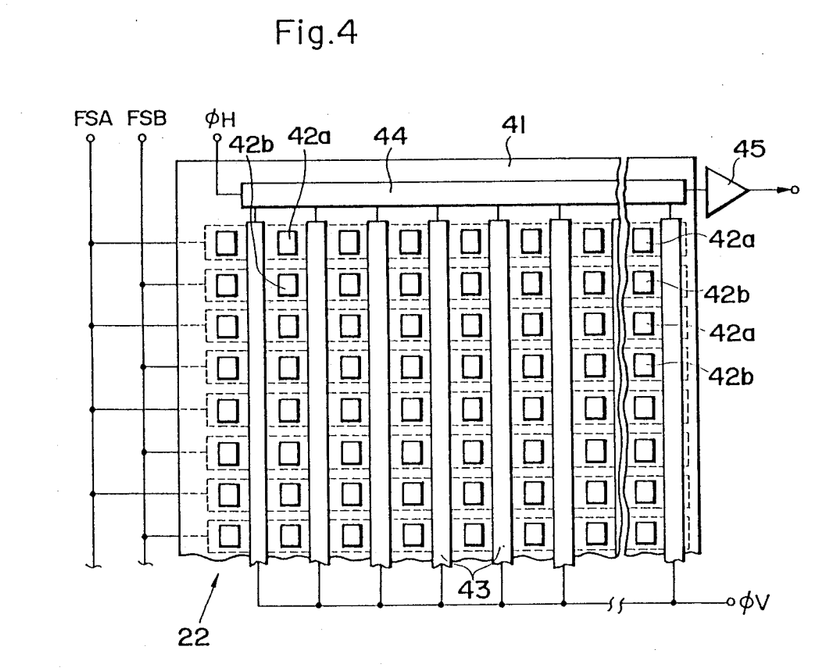
FIG. 4 is a schematic view illustrating the construction of a CCD image sensor used in a still-video camera.

As illustrated in FIG. 4, which schematically illustrates the structure of the CCD image sensor 22, a number of light-receiving elements each having a charge storing section are arrayed in a matrix on a substrate 41. These light-receiving elements store up electric charges generated in conformity with the intensity of incident light. The light-receiving elements are grouped into alternating horizontal rows of first light-receiving elements 42a and second light-receiving elements 42b. These first light-receiving elements 42a and second light-receiving elements 42b are respectively supplied with the first field shift signal FSA and the second field shift signal FSB from the CCD drive circuit 27, and the stored electric charges are sent out on vertical transfer paths 43.

The charges delivered to the vertical transfer paths 43 are delivered successively to a horizontal transfer path 44 in response to the application of the vertical transfer pulse $\phi_V$, and the video signals can be extracted successively from an amplifier 45 in response to the application of the horizontal transfer pulse $\phi_H$. Such charge transfer processing is performed with regard to the charges of the first light-receiving elements 42a in the first field and with regard to the charges of the second light-receiving elements 42b in the second field. Thereby, one frame of an image is constructed from the video signals of each of these fields.

Figure 5:
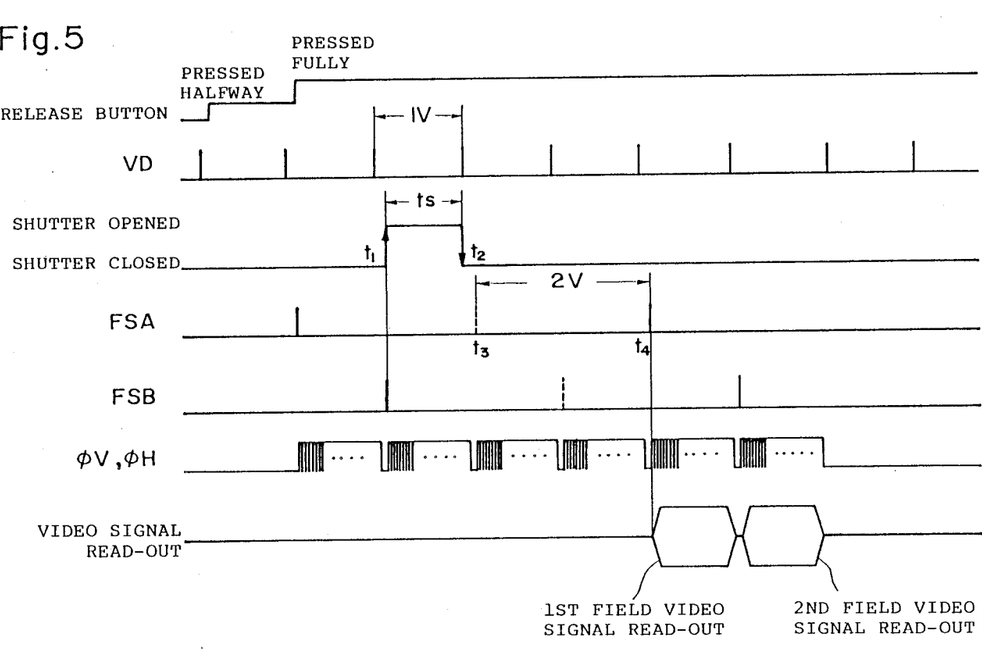
FIG. 5 is a time chart illustrating the operation in a case where the exposure time is within 1 V.
Figure 6:
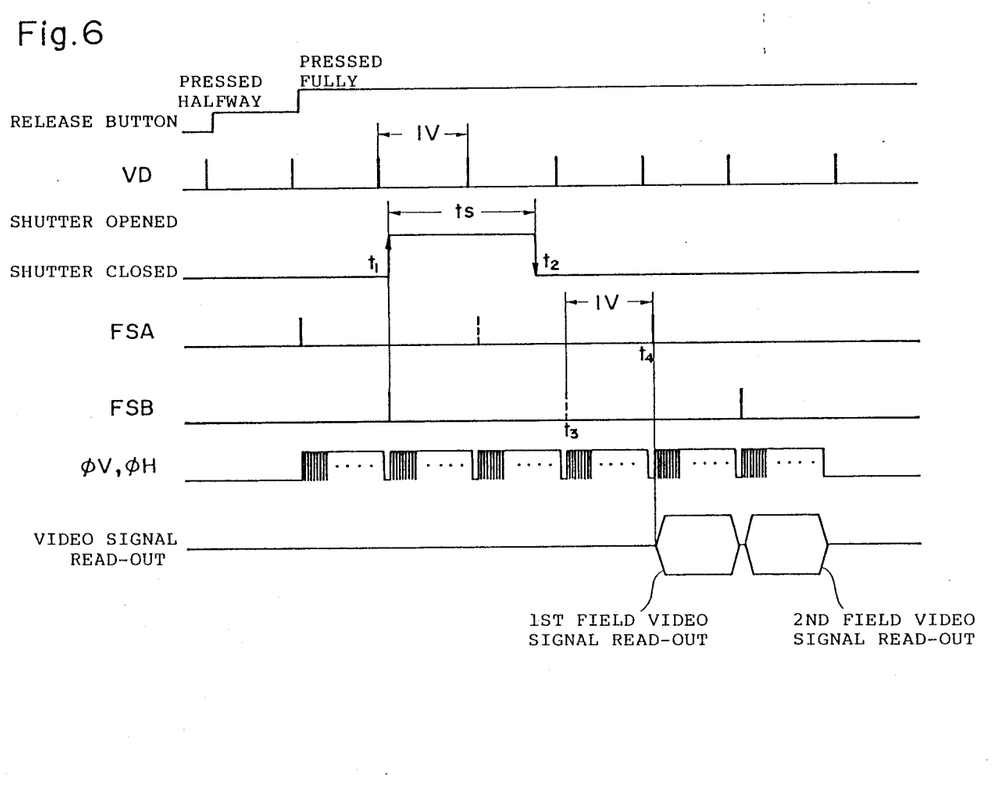
FIG. 6 is a time chart illustrating the operation in a case where the exposure time is greater than 1 V and less than 2 V.

In order to eliminate smear noise in this still-video camera, the arrangement is such that after the shutter 21 is opened at a time $t_1$ in synchronization with the second field shift pulse FSB, as illustrated in FIG. 5, the first field shift pulse FSA (indicated by the dashed line) to be initially supplied at a time $t_3$ is masked and rendered ineffective following the completion of the exposure brought about by closing the shutter 21 at time $t_2$ (this can be accomplished by using the gates 21 and 22, as described earlier, or by program processing). This pulse is thus prevented from being supplied to the CCD image sensor 22. Unnecessary charge which is the cause of smear noise is eliminated from the vertical and horizontal transfer paths 43 and 44 by the vertical and horizontal transfer pulses $\phi_V$ and $\phi_H$ supplied during the following invertal of 1 V. In a case where the exposure time ts is greater than 1 V, the second field shift pulse FSB generated at a time t is also masked, as illustrated in FIG. 6, and smear noise is eliminated by the vertical and horizontal transfer pulses $\phi_V$ and $\phi_H$ in the immediately following interval of 1 V.

In order to provide no difference between the dark current contained in the video signal of the first field and the dash current contained in the video signal of the second field in this still-video camera, the timing at which the electric charges of the first light-receiving elements 42a are read out to the vertical transfer paths 43 is shifted in accordance with the exposure time ts decided by the actuation of the shutter 21. Specifically, the arrangement is such that the video signal is read out upon elapse of the interval of 1 V or 2 V from the moment $t_3$ at which the first field shift pulse FSA the second field shift pulse FSB, which is masked in order to eliminate smear noise, is to be generated. The interval by which the video signal readout timing is shifted is set to 2 V from the time $t_3$ when the following holds:

$$ts \leq 1 \text{ V or}$$

$$2mV < ts \leq (2m+1)V$$

(where m is a positive integer), as illustrated in FIG. 5, and to 1 V from the time $t_3$ when the following holds:

$$(2m-1)V \leq ts \leq 2mV$$

as illustrated in FIG. 6, where the above expressions represent the relationship between the exposure time ts and the vertical scanning interval V. Since the exposure time ts almost never surpasses 2 V to take blurring into account in a still-video camera, the timing $t_4$ at which the video signal of the first field is read out is set to occur after a delay of 2 V when ts $\leq$ 1 V holds and after a delay of 1 V when ts > 1 V holds.

The operation of the still-video camera constructed as set forth above will now be described.

When the release button 28a is pressed halfway, the system controller 20 actuates the exposure control circuit 26, which proceeds to perform photometry, in response to the signal from the release operation detection circuit 28 indicating halfway depression of the button. Based on the photometric value, the exposure control circuit 26 calculates the f-stop and the shutter speed (exposure time) corresponding to the brightness of the subject. When the release button 28a is fully pressed in length, the system controller 20 receives the signal indicative of this state and responds by supplying the timing signal VD to the CCD drive circuit 27. Thereby, the starting drive of the CCD image sensor 22 is started.

As illustrated in FIG. 5, after the CCD image sensor 22 starts being driven into operation, the diaphragm 32 is stopped down to a predetermined f-stop, and the shutter 21 is opened for a suitable exposure time ts to carry out exposure, in synchronization with the initial second field shift pulse FSB from the CCD drive circuit 27. The first field shift pulse FSA, the second field shift pulse FSB, and the vertical and horizontal transfer pulses $\phi_V$ and $\phi_H$ are supplied to the CCD image sensor 22 until time $t_1$, which is when the exposure starts. Accordingly, the charges stored in the first light-receiving elements 42a and the second light-receiving elements 42b are swept out at this point in time.

However, as is evident from FIG. 5, the timing at which the unnecessary charges are swept out of the first light-receiving elements 42a by the first shift pulse FSA precedes by 1 V the timing at which the unnecessary charges are swept out of the second light-receiving elements 42b. Therefore, the stored charges due to dark current are always greater in the first light-receiving elements 42a than in the second light-receiving elements 42b. This fact is taken into consideration to eliminate smear noise upon the completion of exposure and to make the dark currents in the first field and the second field equal, the second field shift pulse FSB is rendered ineffective by masking after the first field shift pulse FSA is masked at the time $t_3$. Read-out of the video signal of the first field and read-out of the video signal of the second field are performed in succession after a delay of 2 V from the time $t_3$. These video signals are recorded by the recording unit 29.

By virtue of this arrangement, the charge storage interval due to the dark current in the first light-receiving elements 42a becomes 4 V, and the charge storage interval due to the dark current in the second light-receiving elements 42b also becomes Thereby, the two charge storage intervals coincide. At video signal read-out, the charges due to the dark currents are superimposed in the same way in both the video signal of the first field and the video signal of the second field. Consequently, when these video signals are played back after being recorded, a difference in image brightness between the two fields is eliminated and a deterioration in the image due to flicker can be prevented.

In a case where the exposure time ts is greater than 1 V, the charge storage times due to the dark currents will coincide at 4 V for both the first and the second light-receiving elements 42a, 42b. Thus, flicker is assured not to occur in the played back image, as shown in FIG. 6, when the video signals of the first and second fields are read out successively after a delay of 1 V from the time $t_3$ at which smear noise is eliminated.

In a case where the exposure time ts is limited to be within 2 V (1/30 sec), the video signal of the first field should be read out from the first field shift pulse FSA supplied upon elapse of the interval 3 V from the time $t_1$ at which the shutter 21 is opened, and the video signal of the second field should be read out in response to the ensuing second field shift pulse FSB. Furthermore, the present invention can be applied also to an electronic still-video camera so adapted that both field photography and frame photography can selected. In such case, it will suffice to arrange for the foregoing processing to be executed when the mode is changed over to frame photography.

As many apparently widely different embodiments of the present invention can be made without departing from the spirit and scope thereof, it is to be understood that the invention is not limited to the specific embodiments thereof except as defined in the appended claims.

What is claimed is:
1. A still-video camera comprising:
 a solid-state electronic imaging device for reading-out by interlaced scanning;
 a shutter for controlling incidence of a subject light image upon said solid-state imaging device;
 controlling means for controlling interlaced scanning read-out in said solid-state electronic imaging device by alternately generating field shift signals of first and second fields at a fixed period; and
 disabling means for disabling read-out by the field shift signals at least while said shutter is open, said disabling means operating in such a manner that equal numbers of the field shift signals of the first and second fields are disabled.

2. The still-video camera according to claim 1, wherein the field shift signal of the first field and the field shift signal of the second field are disabled by said disabling means even after said shutter is closed and while said shutter is open.

3. The still-video camera according to claim 2, wherein at least one of the field shift signals immediately following closure of said shutter is disabled by said disabling means.

4. The still-video camera according to claim 2, wherein the field shift signal of the first field and the field shift signal of the second field immediately following closure of said shutter are disabled by said disabling means.

* * * * *